United States Patent [19]

Hayes

[11] 4,108,825

[45] Aug. 22, 1978

[54] FLAME RETARDANT HEAT-CURABLE SILICONE COMPOSITIONS CONTAINING CERIC HYDRATE

[75] Inventor: William R. Hayes, Midland, Mich.

[73] Assignee: Dow Corning Corporation, Midland, Mich.

[21] Appl. No.: 869,336

[22] Filed: Jan. 13, 1978

Related U.S. Application Data

[63] Continuation-in-part of Ser. No. 774,830, Mar. 7, 1977, abandoned.

[51] Int. Cl.$^2$ ............................................. C08L 83/04
[52] U.S. Cl. ......................... 260/37 SB; 260/45.75 R
[58] Field of Search .................. 260/37 SB, 46.5 UA, 260/45.75 R

[56] References Cited

U.S. PATENT DOCUMENTS

| | | | |
|---|---|---|---|
| 2,823,218 | 2/1958 | Speier | 260/46.5 Y |
| 3,821,140 | 6/1974 | Milbert | 260/37 SB |

*Primary Examiner*—Lewis T. Jacobs
*Attorney, Agent, or Firm*—Roger H. Borrousch

[57] ABSTRACT

A silicone composition cures to a flame retardant silicone elastomer by heating. The composition contains 100 parts by weight of vinyl-containing polydiorganosiloxane fluid with a viscosity of 0.2 to 30 Pa s at 25° C., an organohydrogensiloxane in an amount sufficient to provide from 1.2 to 3 silicon-bonded hydrogen atoms for every silicon-bonded vinyl group in the composition, from 5 to 100 parts by weight of reinforcing silica filler, a platinum catalyst providing at least 1 part by weight of platinum for every one million parts by weight of polydiorganosiloxane fluid, and from 0.1 to 3 parts of ceric hydrate. The flame retardant silicone composition is useful for potting, encapsulating, molding and extruding processes.

12 Claims, No Drawings

FLAME RETARDANT HEAT-CURABLE SILICONE COMPOSITIONS CONTAINING CERIC HYDRATE

This application is a continuation-in-part of application Ser. No. 774,830, filed Mar. 7, 1977 now abandoned.

BACKGROUND OF THE INVENTION

1. Field of the Invention

This invention relates to flame retardant silicone elastomers.

2. Description of the Prior Art

Curable silicone elastomers comprising vinyl-containing polydiorganosiloxane fluids and organohydrogensiloxane fluids containing silicon-bonded hydrogen atoms cured through the use of a platinum catalyst are well known in the art. Compositions containing platinum compounds to improve the flame resistance are disclosed in Canadian Pat. No. 768,223 to Compton. Such materials have a certain amount of resistance to burning.

The use of platinum as a catalyst for the reaction of a compound containing a silicon-bonded hydrogen atom with a compound containing aliphatic unsaturation to establish a new Si—C bond is disclosed in U.S. Pat. No. 2,823,218. Many elastomeric products based on this reaction have become commercially available. An object of this invention is to improve the flame retardancy of elastomers cured using this method.

A polysiloxane composition curable to a fire resistant elastomer has been disclosed by Milbert in U.S. Pat. No. 3,821,140. The composition of Milbert comprises 100 parts of at least one diorganopolysiloxane rubber of viscosity 2 million to 80 million centipoises (2000–80,000 Pa·s) at 25° C., 5 to 100 parts of at least one inorganic filler, 0.2 to 5 parts of an organic peroxide, 0.001 to 0.01 parts of platinum and either 3 to 35 parts in total of at least one rare earth metal oxide or 1 to 8 parts in total of at least one rare earth metal hydroxide. Milbert's compositions are cured by heating through the use of an organic peroxide by molding under pressure, followed by oven heating.

The compositions of the present invention are of such a viscosity that they may be formed into the desired shape by gravitational flow. The use of heavy molds or equipment to withstand high molding pressures is unnecessary. The use of expensive organic peroxides is not necessary in the present invention in order to effect a cure, whereas the ingredients of the present invention react in the presence of a platinum catalyst to produce the desired cure.

Ceric hydrate has been used commercially to improve the heat stability of organic peroxide cured silicone elastomers. Its use in vinyl-containing polymers with viscosities below 30 Pa·s to improve heat stability has been prevented by the tendency of such mixtures to exhibit poor shelf life. When such mixtures have been attempted the resulting compositions show a rise in viscosity to the point where they are no longer capable of being molded in the desired manner.

SUMMARY OF THE INVENTION

It is an object of the present invention to provide silicone compositions that can be formed under low pressures into a desired configuration and cured to flame retardant elastomers.

It is another object of this invention to improve the flame retardancy of silicone elastomers from silicone compositions of a type previously known.

These and other objects are obtained by the addition of ceric hydrate to compositions comprising certain vinyl-containing polydiorganosiloxane fluid, organohydrogensiloxane, filler, and platinum catalyst.

DESCRIPTION OF THE INVENTION

This invention relates to a silicone composition curable to a flame retardant elastomer comprising a product obtained by mixing (a) 100 parts by weight of a triorganosiloxy endblocked polydiorganosiloxane fluid wherein each organic radical is selected from a group consisting of methyl, ethyl, vinyl, phenyl, and 3,3,3-trifluoropropyl radicals, there being an average of 2 vinyl radicals per molecule and only one vinyl radical bonded to any one silicon atom, there being from 0 to 50 inclusive percent 3,3,3-trifluoropropyl radicals based on the total number of organic radicals in the polydiorganosiloxane fluid, there being from 0 to 10 inclusive percent of phenyl radicals based on the total number of organic radicals in the polydiorganosiloxane fluid, the fluid having a viscosity of from 0.2 to 30 Pa·s measured at 25° C., (b) an organohydrogensiloxane having an average of at least 2.1 silicon-bonded hydrogen atoms per molecule, no silicon atom having bonded thereto more than one silicon-bonded hydrogen atom, said molecules consisting essentially of units selected from the group consisting of $H(CH_3)SiO$ units, $R_2SiO$ units, $H(CH_3)_2SiO_{\frac{1}{2}}$ units, and $R_3SiO_{\frac{1}{2}}$ units, R being selected from the group consisting of alkyl radicals having from 1 to 6 carbon atoms inclusive, phenyl, and 3,3,3-trifluoropropyl radicals, the amount of organohydrogensiloxane being sufficient to provide from 1.2 to 3 inclusive silicon-bonded hydrogen atoms for every silicon-bonded vinyl group in the polydiorganosiloxane fluid, (c) from 5 to 100 parts by weight of a reinforcing silica filler having a surface area of at least 50 square meters per gram and having the surface thereof treated with an organosilicon compound to control crepe-aging of the curable silicone composition so that the viscosity does not rise above 250 Pa·s at 25° C. during the shelf life of the composition, (d) a platinum catalyst, soluble in (a), and providing at least 1 part by weight of platinum for every one million parts by weight of the polydiorganosiloxane fluid (a), and (e) from 0.1 to 3 parts by weight of ceric hydrate wherein the cerium atoms are in the tetravalent state, the other atoms of the compound are hydrogen atoms and oxygen atoms, said hydrogen atoms are present as —OH radicals, $H_2O$ molecules or both, and said hydrogen atoms are present in an amount, determined as $H_2O$ molecules, from 1 to 10 weight percent inclusive based on the total weight of ceric hydrate.

This invention is based on the discovery that ceric hydrate can be successfully added to low viscosity compositions of vinyl-containing polydiorganosiloxanes without shortening the shelf life of the compositions to a point where commercial use is impractical. A further discovery was made that the addition of ceric hydrate to compositions made up of vinyl-containing polydiorganosiloxanes and organohydrogensiloxanes containing silicon-bonded hydrogen atoms when cured with a platinum containing catalyst would yield elastomeric products with greatly improved flame retardance.

The vinyl-containing polydiorganosiloxane fluids used in this invention are well known in the art. The polydiorganosiloxane fluid has an average of two silicon-bonded vinyl radicals per molecule, only one vinyl radical is bonded to any one silicon atom, and the remaining organic radicals can be methyl, ethyl, phenyl or 3,3,3-trifluoropropyl radicals, there being from 0 to 50 inclusive percent 3,3,3-trifluoropropyl radicals. The phenyl radicals can be present in an amount of from 0 to 10 percent inclusive, all percentages being based on the total number of organic radicals in the polydiorganosiloxane fluid. The polydiorganosiloxane fluid is endblocked by triorganosiloxy groups. The triorganosiloxy groups have organic radicals selected from the same group of organic radicals listed above. The polydiorganosiloxane fluid has a viscosity of 0.2 to 30 Pa·s at 25° C. The preferred polydiorganosiloxane fluid is endblocked by vinyldiorganosiloxy groups, as illustrated by the formula:

$$(CH_2=CH)R_2SiO(R_2SiO)_xSiR_2(CH=CH_2)$$

where each R is a radical as defined above for the organic radicals and has a value such that the viscosity is from 1 to 15 Pa·s at 25° C.

The organohydrogensiloxanes containing silicon-bonded hydrogen atoms are also well known in the art such as described by Polmanteer et al. in U.S. Pat. No. 3,697,473 and Lee et al. in U.S. Pat. No. 3,989,668, which patents are hereby incorporated by reference to show examples of organohydrogensiloxanes known in the art. The organohydrogensiloxanes useful for the present invention can be any siloxane having an average of at least 2.1 silicon-bonded hydrogen atoms per molecule and an average of no more than one silicon-bonded hydrogen atom per silicon atom. The remaining valences of the silicon atoms are satisfied by divalent oxygen atoms or by monovalent hydrocarbon radicals having less than 6 carbon atoms per radical such as methyl, isopropyl, tertiarybutyl and cyclohexyl, and phenyl, and 3,3,3-trifluoropropyl radicals. The organohydrogensiloxanes can be homopolymers, copolymers, and mixtures thereof which contain siloxane units of the following types:

$R_2SiO$, $R_3SiO_{0.5}$, $H(CH_3)SiO$, and $H(CH_3)_2SiO_{0.5}$ where R is the monovalent hydrocarbon defined above. Some specific examples include polymethylhydrogensiloxane cyclics, copolymers of trimethylsiloxy and methylhydrogensiloxane units, copolymers of dimethylhydrogensiloxy and methylhydrogensiloxane units, copolymers of trimethylsiloxy, dimethylsiloxane, and methylhydrogensiloxane units, and copolymers of dimethylhydrogensiloxy, dimethylsiloxane, and methylhydrogensiloxane units. Preferably, the organohydrogensiloxanes have an average of at least 5 silicon-bonded hydrogen atoms per molecule.

The compositions of this invention are cured with the aid of a catalyst (d) which can be any of the platinum-containing catalysts that are known to catalyze the reaction of silicon-bonded hydrogen atoms with silicon-bonded vinyl groups and which are soluble in the polydiorganosiloxane fluid (a). Platinum-containing catalysts which are not soluble in said fluid are not sufficiently effective to provide for the compositions of this invention. A class of platinum-containing catalysts particularly suitable for use in the compositions of this invention are the complexes of chloroplatinic acid described by Willing in U.S. Pat. No. 3,419,593 which is hereby incorporated by reference to show the preparation of said complexes and the complexes per se. A preferred catalyst, described by Willing, is a platinum-containing complex which is the reaction product of chloroplatinic acid and sym-divinyltetramethyldisiloxane.

The platinum-containing catalyst (d) is present in an amount sufficient to provide at least one part by weight of platinum for every one million parts by weight of the polydiorganosiloxane fluid (a). It is preferred to use sufficient catalyst (d) so that there is present from 5 to 50 parts by weight platinum for every one million parts by weight of polydiorganosiloxane fluid (a). It is to be understood that amounts of platinum greater than the 50 parts per million stated above are also effective in the compositions of this invention but said larger amounts, especially when the preferred catalyst is used, are unnecessary and wasteful.

A mixture of components (a), (b) and (d) may begin to cure immediately on mixing at room temperature, therefore, it is necessary to inhibit the action of the catalyst (d) at room temperature with a platinum catalyst inhibitor if the composition is to be stored before molding.

One type of platinum catalyst inhibitor suitable for use in the acetylenic inhibitors described in U.S. Pat. No. 3,445,420 to Kookootsedes et al. which is hereby incorporated by reference to show the preparation of acetylenic inhibitors and their use as inhibitors.

A second type of platinum catalyst inhibitor are the olefinic siloxanes that are described in U.S. Pat. No. 3,989,667 to Chi-Long Lee and Ollie W. Marko which is hereby incorporated by reference to show the preparation of olefinic siloxanes and their use in silicone compositions as platinum catalyst inhibitors. In particular, olefinic siloxanes having the formula

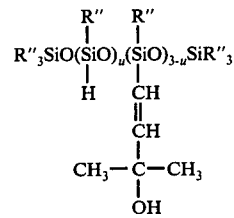

are preferred as the platinum catalyst inhibitor because these olefinic siloxanes inhibit the action of catalyst (d) for more than 24 hours at room temperature. Furthermore, the low volatility of these preferred olefinic siloxanes permits the use of the compositions of this invention in the open without concern for loss of the inhibitor due to evaporation. Each R" in the olefinic siloxanes above can be, independently, methyl, ethyl, phenyl, or 3,3,3-trifluoropropyl and $u$ can be 1 or 2. It is to be understood that mixtures of olefinic siloxanes of the formula shown in which $u$ is 1 or 2 are also operative as platinum catalyst inhibitor in the compositions of this invention.

A third type of platinum catalyst inhibitor suitable for use are the vinylorganocyclosiloxanes of the formula

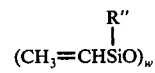

wherein R" is methyl, ethyl, phenyl or 3,3,3-trifluoropropyl and $w$ has an average value of from 3 to 6. Vinylorganocyclosiloxanes are well known in the organosilicon art, especially where R" is methyl and $w$ is 3, 4 or 5.

The amount of platinum catalyst inhibitor to be used in the compositions of this invention is simply the amount needed to produce the desired shelf life and yet not extend the cure time of the compositions of this invention to an impractical level. This amount will vary widely and will depend upon the particular inhibitor that is used, the nature and concentration of the platinum-containing catalyst (d) and the nature of the organohydrogensiloxane (b).

Inhibitor added in amounts as small as one mole of inhibitor for every mole of platinum will in some instances cause an inhibition of the catalyst (d) and afford a satisfactory pot life. In other cases, considerably more inhibitor, such as 10, 50, 100, 500 and more moles of inhibitor for every mole of platinum may be needed to achieve the desired combination of pot life and cure time. The exact amount of any particular inhibitor to be used in the compositions of this invention should be determined by simple experimentation.

The inhibiting effect of platinum catalyst inhibitor can be overcome by heating the compositions of this invention to a temperature of 70° C. or higher.

The filler (c) is a reinforcing silica filler having a surface area of greater than 50 square meters per gram, preferably greater than 150 square meters per gram, that has been treated with an organosilicon compound so that the compositions of this invention do not undergo appreciable stiffening with time, a phenomenon known as crepe-aging. The organic groups of said organosilicon compound can be methyl, ethyl, phenyl, vinyl or 3,3,3-trifluoropropyl. Organosilicon compounds which deposit on the surface of the silica filler triorganosiloxane units such as trimethylsiloxane units, vinyldimethylsiloxane units and dimethyl-3,3,3-trifluoropropylsiloxane units are preferred treating agents.

Silica fillers and their treatment are well known in the silicone rubber art. The silica filler can be pretreated or treated in situ in the well known fashion. Methods of preparing treated silica fillers are taught by Smith in U.S. Pat. No. 3,635,743 and by Hartlage in U.S. Pat. No. 3,624,023 which are hereby incorporated by reference to show the preparation of treated silica fillers which are suitable for use in the compositions of this invention. However, silica filler (c) can be prepared by any suitable method for preparing treated silicas as long as the surface area of the silica is as stated herein and the compositions do not undergo appreciable crepe-aging.

The amount of filler that is used in the compositions of this invention must be from 5 to 100 parts by weight. The preferred amount of filler that is used in the compositions of this invention depends upon the desired properties of the final elastomer. In general, as more reinforcing filler is added, the hardness and tensile strength of the cured product increased. However, the amount of filler used should not be so great that the viscosity of the uncured compound becomes too high for practical use in a desired molding process. The compositions of the present invention are of such a viscosity that they may be formed into the desired shape by gravitational flow. They may also be injected into light weight molds under low pressures, such as 600 kPa cylinder pressure, in a liquid injection molding process. The compositions can be cured very rapidly in a hot mold and removed without cooling the mold in such a liquid injection molding process. The upper viscosity limit of a composition using predominately a reinforcing filler is about 160 Pa·s.

The compositions of this invention may also contain extending filler such as ground quartz. The extending fillers are added to impart such properties as greater hardness without the degree of viscosity increase of the uncured composition that arises from the addition of reinforcing filler. The flow behavior of the compositions is different also so that the upper viscosity limit of a composition containing extending filler is about 250 Pa·s at 25° C. The viscosity of the composition is measured by conventional means such as a Brookfield viscometer. This measures the viscosity under low shear conditions. Under high shear conditions, such as during injection molding processes, the relative viscosity of the composition changes depending upon the thixotropic character of the composition. For this reason the upper viscosity limit of the composition is different depending upon the filler type and ratio used.

Ceric hydrate (e) is present in an amount from 0.1 to 3 parts by weight based on the weight of the composition, preferably from 0.5 to 2 parts by weight. The ceric hydrate is a partially hydrated form of ceric oxide in which the general formula might be written as

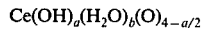

$$Ce(OH)_a(H_2O)_b(O)_{4-a/2}$$

where $a$ is at least 0.1 and/or $b$ is at least 0.1. Another way in which the general formula for ceric hydrate might be written is $CeO_2 \cdot nH_2O$, where $n$ has a value from 0.1 to 1.1 inclusive. Ceric hydrate is believed to be composed of —OH radicals bonded to the cerium atom by primary chemical bonds and water molecules bonded to the cerium atom through oxygen atoms by hydrogen bonding or by association of the oxygen atom of the water molecule directly to the cerium atom. Inasmuch as the exact chemical structure or formula is unknown, the best description for ceric hydrate which will be operative in this invention to provide the unique properties is a compound of cerium in the tetravalent state wherein the remaining atoms of the compound are oxygen atoms and hydrogen atoms, said hydrogen atoms being present as radicals of the formula —OH or as molecules of the form $H_2O$ or both. The amount of hydrogen atoms, determined as $H_2O$ molecules, is from 1 to 10 weight percent based on the total weight of ceric hydrate. Preferably, the amount of hydrogen atoms, determined as $H_2O$ molecules, is from 4 to 8 weight percent based on the total weight of ceric hydrate.

The compositions of this invention may contain other components that are common to the silicone rubber art, such as pigments, other extending fillers, anti-oxidants, compression set additives, and thermal stability additives as long as the desirable flame retardant properties of said compositions are not compromised thereby.

The compositions of this invention are obtained whenever the recited components are mixed in the proportions necessary to meet the above limits. The order of mixing is not critical; however, if the composition is not to be used immediately or if the composition is to be used in a method of liquid injection molding, it is preferred to have inhibitor present when polydiorganosiloxane fluid (a), organohydrogensiloxane (b) and catalyst (d) are mixed, since a curing reaction involving components (a), (b), and (d) begins immediately at room temperature if inhibitor is not present.

Since component (b) and the inhibitor frequently are volatile or contain desirable volatile compounds, it is preferred that said components be admixed after any and all heating and/or vacuum operations in the preparation of the compositions of this invention have been completed. It is also preferred that no component or mixture of components be heated above 300° C. during the preparation of the compositions of this invention.

The ceric hydrate is added after any and all heating operations in the preparation of the compositions of this invention. It has been found that if the ceric hydrate is present with the polydiorganosiloxane fluid and filler during a heating operation, the viscosity of the resulting composition is not stable on storage. When the ceric hydrate is added after heating, the storage time before the viscosity increases to an unusable level is increased. If it is desired to store the compositions before curing, the inhibitor should also be present.

The best way to prepare the compositions of this invention is to mix polydiorganosiloxane fluid (a), silica (c) and any additives in a dough mixer, using heat to facilitate mixing and vacuum to remove volatile materials. The resulting mixture is then cooled below 50° C., preferably to room temperature and mixed with the catalyst (d), the inhibitor, the organohydrogenpolysiloxane (b) and the ceric hydrate in that order. Alternately components (b), (d), inhibitor, and ceric hydrate can be added to the cooled mixture simultaneously or in any order that provides for the presence of inhibitor whenever components (a), (b), and (d) are mixed.

The compositions of this invention can be prepared to have a pot life of several days at room temperature and are, therefore, considered to be one-package compositions; i.e. said compositions can be prepared and stored before using. Storing the compositions of this invention at low temperatures, e.g. at −20° C., will permit an even longer period of storage. It is obvious that said compositions can also be prepared by combining two or more packages, each package comprising an uncurable mixture of some of the components of the composition. For example, it is within the scope of this invention to prepare a first package comprising a mixture of the appropriate amounts of polydiorganosiloxane fluid (a), silica (c), and catalyst (d) and a second package comprising a mixture of the appropriate amounts of organohydrogensiloxane (b), inhibitor, and ceric hydrate and to mix the two packages to prepare the compositions of this invention at any time prior to use of said compositions. Obviously there are many other ways to combine the recited components to prepare the compositions of this invention in multi-package form.

The compositions of this invention are curable by heating them to a temperature sufficient to cause curing, preferably greater than 100° C., either in a confined area or exposed to the atmosphere. Curing temperatures of greater than 300° C., should be avoided. The compositions of this invention are useful in any type of molding operation providing the required temperatures and times to produce the desired degree of cure are available.

At the present time there are several test methods for comparative evaluation of the flammability of materials in the laboratory. One of these tests is Underwriters Laboratories Inc. UL 94, "Standard for Tests for Flammability of Plastic Materials for Parts in Devices and Appliances." Samples of the compositions of this invention were tested in accordance with the second edition of the above Standard dated May 2, 1975 under the Vertical Burning Test for Classifying Materials section. The specimen size and conditioning is stated in the individual examples below. The "pass" criteria of UL 94 V1 consists of not having any specimens which burn with flaming combustion for more than 30 seconds after each application of the test flame and not having a total flaming combustion time exceeding 250 seconds for the 10 flame applications for each set of 5 specimens. The test results give the total flame time for 10 applications of the test flame. None of the specimens burned up to the holding clamp, nor was there any drip of flaming particles.

Another laboratory test method is described by Boeing Specification Support Standard 7230 dated May 27, 1976. Section 6.3.2, Vertical Test Method (12 sec. Ignition) specifies the test conditions used to meet Boeing Material Specification 1-59C. The values for flame time are the average for 3 specimens as are the burn length values. The "pass" criteria is 30 seconds maximum on flame and glow time and 1 inch on burn length.

A third laboratory test method is ASTM D2863-74, "Standard Method of Test for Flammability of Plastics Using the Oxygen Index Method." The Oxygen Index is the minimum concentration of oxygen, expressed as percent by volume, in a mixture of oxygen and nitrogen which will just support combustion of a material under conditions of the method.

The following examples are included for illustrative purposes only and should not be construed as limiting the invention which is properly delineated by the appended claims. All parts are parts by weight.

EXAMPLE 1

A mixture was prepared consisting of 58 parts of a methylphenylvinylsiloxy endblocked polydimethylsiloxane having a viscosity of approximately 2 Pa·s at 25° C., 6 parts of a methylphenylvinylsiloxy endblocked polydimethylsiloxane having a viscosity of approximately 10 Pa·s at 25° C., 20 parts of fumed silica having a surface area of 300 square meters per gram, 12 parts of 5 micrometer ground quartz, 0.16 part of a chloroplatinic acid complex with symetrical divinyltetramethyldisiloxane containing about 0.65 percent platinum, 0.02 part of 3-methyl-1-butyn-3-ol, 1.8 parts of a trimethylsiloxy endblocked polyorganosiloxane having an average of 5 methylhydrogensiloxane units and 3 dimethylsiloxane units, and 0.06 part of polymethylvinylsiloxane cyclics. The composition was thoroughly mixed. To one portion was added 0.5 percent of lamp black based on the total weight of the composition to serve as a comparison. To another portion was added 0.5 percent of ceric hydrate based on the total weight of the composition. After mixing, each sample was formed into a nominal 3.2 mm thick slab by press molding and curing for 5 minutes at 150° C. The slabs were then post cured for 8 hours at 200° C. in an air circulating oven. Samples of these slabs were then tested for flame retardancy according to the procedures previously described. The results of these tests were:

| Test | None | Additive Lamp Black | Ceric Hydrate |
|---|---|---|---|
| UL 94 V1 | fail | pass | pass |
| BMS 1-59 | fail | pass | pass |

EXAMPLE 2

A two part composition was made. Part A was made by mixing 57.4 parts of a methylphenylvinylsiloxy endblocked polydimethylsiloxane having a viscosity of 12.8 parts of 5 micrometer ground quartz, 1.6 parts of water, and 6.9 parts of hexamethyldisilazane. After mixing and heating to remove volatile materials, the composition was cooled and 0.3 part of a chloroplatinic acid catalyst complex with symetrical divinyltetramethyldisiloxane containing about 0.65 percent platinum was added. The composition was inhibited with 0.04 part of 3-methyl-1-butyn-3-ol.

Part B was made by mixing 49.5 parts of the polydimethylsiloxane of Part A, 21.7 parts of fumed silica, 13 parts of 5 micrometer ground quartz, 1.7 parts of water, and 5.4 parts of hexamethyldisilazane. After mixing and heating to remove volatile materials, the composition was cooled and 8.7 parts of a trimethylsiloxy endblocked polyorganosiloxane having an average of 5 methylhydrogensiloxane units and 3 dimethylsiloxane units was added as was 0.1 part of methylvinylcyclosiloxane to provide pot life.

A masterbatch of ceric hydrate was prepared by mixing 50 percent ceric hydrate powder in 50 percent methylphenylvinylsiloxy endblocked polydimethylsiloxane fluid. Another masterbatch of fumed titanium dioxide was prepared by mixing 50 percent fumed titanium dioxide powder in 50 percent methylphenylvinylsiloxy endblocked polydimethylsiloxane fluid.

Elastomers were formed by mixing equal parts of A and B described above then adding the amount of masterbatch shown in Table I below, the percent masterbatch being based on the total weight of A and B, and press molding a slab as described in Example I. After post curing, the slabs were heated in an air-circulating oven 13 cm long and 12.7 mm wide. The thickness was measured and the values shown in Table I were an average of five test strips for the UL-94 flame test. The test sample strips for the BMS-1-59 flame test were about 57 mm square. The thickness was measured and the values shown in Table I were an average of three test pieces for the BMS-1-59 flame test. The flame test results were as shown in Table I.

TABLE I

| Ceric hydrate masterbatch, % | 0 | 1 | 0 | 2 |
|---|---|---|---|---|
| TiO$_2$ masterbatch, % | — | — | 4 | 4 |
| UL 94 test strip thickness, mm | 1.85 | 1.85 | 1.98 | 1.70 |
| UL 94, total burn time, sec. | 560 | 104 | 477 | 89.8 |
| BMS-1-59 test piece thickness, mm | 1.93 | 1.90 | 1.93 | 1.80 |
| BMS 1-59, sec. | 107 | 16 | 72 | 6 |
| BMS 1-59, burn length, mm. | 28 | 1.6 | 15.9 | 1.6 |

EXAMPLE 3

A two part composition using the formulation of Example 2 was prepared. Equal parts of A and B were mixed with the amounts of ceric hydrate masterbatch shown in Table II. Slabs were molded, cured and samples prepared as described in Example 2, with the exception that the thickness of the sample strips was a nominal 3.2 mm. The flame test results were as shown in Table II.

TABLE II

| Ceric hydrate masterbatch, % | 0 | 0.1 | 0.5 | 1.0 | 2.5 |
|---|---|---|---|---|---|
| UL 94, total burn time, sec. | 140 | 133 | 91 | 91 | 56 |

EXAMPLE 4

A two part composition using the formulation of Example 2 was prepared. Equal parts of A and B were mixed with the amounts of ceric hydrate masterbatch shown in Table III. Slabs were molded as described in Example 2 and were conditioned for 48 hours at 24° C and 50 percent relative humidity. Test samples were about 10 cm long. The width and thickness were measured and the values were as shown in Table III. The test strip dimensions for the composition containing 0% ceric hydrate masterbatch was an average of three test strips. The test strip dimensions for the composition containing 2% ceric hydrate masterbatch was an average of four test strips. Samples of these slabs were then tested in accordance with ASTM D2863-74. "Standard Method of Test for Flammability of Plastics Using the Oxygen Index Method." Average results of testing three samples are shown in Table III.

TABLE III

| Ceric hydrate masterbatch, % | 0 | 2 |
|---|---|---|
| Oxygen Index | 29.1 | 31.0 |
| Width, mm | 6.32 | 6.22 |
| Thickness, mm | 3.28 | 3.12 |

That which is claimed is:

1. A silicone composition curable to a flame retardant elastomer comprising a product obtained by mixing (a) 100 parts by weight of a triorganosiloxy endblocked polydiorganosiloxane fluid wherein each organic radical is selected from a group consisting of methyl, ethyl, vinyl, phenyl, and 3,3,3-trifluoropropyl radicals, there being an average of 2 vinyl radicals per molecule and only one vinyl radical bonded to any one silicon atom, there being from 0 to 50 inclusive percent 3,3,3-trifluoropropyl radicals based on the total number of organic radicals in the polydiorganosiloxane fluid, there being from 0 to 10 inclusive percent of phenyl radicals based on the total number of organic radicals in the polydiorganosiloxane fluid, the fluid having a viscosity of from 0.2 to 30 Pa·s measured at 25° C., (b) an organohydrogensiloxane having an average of at least 2.1 silicon-bonded hydrogen atoms per molecule, no silicon atom having bonded thereto more than one silicon-bonded hydrogen atom, said molecules consisting essentially of units selected from the group consisting of H(CH$_3$)SiO units, R$_2$SiO units, H(CH$_3$)$_2$ SiO$_{\frac{1}{2}}$ units, and R$_3$SiO$_{\frac{1}{2}}$ units, R being selected from the group consisting of alkyl radicals having from 1 to 6 carbon atoms inclusive, phenyl and 3,3,3-trifluoropropyl radicals, the amount of organohydrogensiloxane being sufficient to provide from 1.2 to 3 inclusive silicon-bonded hydrogen atoms for every silicon-bonded vinyl group in the polydiorganosiloxane fluid, (c) from 5 to 100 parts by weight of a reinforcing silica filler having a surface area of at least 50 square meters per gram and having the surface thereof treated with an organosilicon compound to control crepe-aging of the curable silicone composition so that the viscosity does not rise above 250 Pa·s at 25° C. during the shelf life of the composition, (d) a platinum catalyst, soluble in (a), and providing at least 1 part by weight of platinum for every one million parts by weight of the polydiorganosiloxane fluid (a), and (e) from 0.1 to 3 parts by weight of ceric hydrate wherein the cerium atoms are in the tetravalent state, the other atoms of the compound are hydrogen atoms and oxygen atoms, said hydrogen atoms are present as —OH radicals, H$_2$O molecules or both, and said hydrogen atoms are present in an amount, determined as H$_2$O molecules, from 1 to 10 weight percent inclusive based on the total weight of ceric hydrate.

2. The composition of claim 1 wherein the polydiorganosiloxane fluid is endblocked with vinyldiorganosiloxy groups.

3. The composition of claim 2 wherein the organohydrogensiloxane (b) is a methylhydrogensiloxane, the filler (c) is present in from 5 to 50 parts, the platinum catalyst (d) is present in from 5 to 50 parts by weight of platinum for every one million parts by weight of the polydiorganosiloxane fluid (a), and an amount of a platinum catalyst inhibitor is present sufficient to give the desired shelf life after mixing.

4. The composition of claim 3 wherein the ceric hydrate is present in an amount from 0.5 to 2 parts by weight based on 100 parts by weight of the polydiorganosiloxane fluid.

5. A method of preparing a silicone composition curable to a flame retardant elastomer comprising mixing
   (a) 100 parts by weight of a triorganosiloxy endblocked polydiorganosiloxane fluid wherein each organic radical is selected from a group consisting of methyl, ethyl, vinyl, phenyl and 3,3,3-trifluoropropyl radicals, there being an average of 2 vinyl radicals per molecule and only one vinyl radical bonded to any one silicon atom, there being from 0 to 50 inclusive percent 3,3,3-trifluoropropyl radicals based on the total number of organic radicals in the polydiorganosiloxane fluid, there being from 0 to 10 inclusive percent of phenyl radicals based on the total number of organic radicals in the polydiorganosiloxane fluid, the fluid having a viscosity of from 0.2 to 30 Pa·s measured at 25° C., and
   (c) from 5 to 100 parts by weight of a reinforcing silica filler having a surface area of at least 50 square meters per gram and having the surface thereof treated with an organosilicon compound to control crepe-aging of the curable silicone composition so that the viscosity does not rise above 250 Pa·s at 25° C. during the shelf life of the composition, heating to above 100° C. to facilitate mixing and removal of volatiles, cooling to below 40° C. and adding
   (b) an organohydrogensiloxane having an average of at least 2.1 silicon-bonded hydrogen atoms per molecule, no silicon atom having bonded thereto more than one silicon-bonded hydrogen atom, said molecules consisting essentially of units selected from the group consisting essentially of H(CH$_3$)SiO units, R$_2$SiO units, H(CH$_3$)$_2$SiO$_{\frac{1}{2}}$ units, and R$_3$SiO$_{\frac{1}{2}}$ units, R being selected from the group consisting of alkyl radicals having from 1 to 6 carbon atoms inclusive, phenyl, and 3,3,3-trifluoropropyl radicals, the amount of organohydrogensiloxane being sufficient to provide from 1.2 to 3 inclusive silicon-bonded hydrogen atoms for every silicon-bonded vinyl group in the polydiorganosiloxane fluid,
   (d) a platinum catalyst, soluble in (a) and providing at least 1 part by weight of platinum for every one million parts by weight of the polydiorganosiloxane fluid (a), and
   (e) from 0.1 to 3 parts by weight of ceric hydrate wherein the cerium atoms are in the tetravalent state, the other atoms of the compound are hydrogen atoms and oxygen atoms, said hydrogen atoms are present as —OH radicals, H$_2$O molecules or both, and said hydrogen atoms are present in an amount, determined as H$_2$O molecules, from 1 to 10 weight percent inclusive based on the total weight of ceric hydrate, the viscosity of polydiorganosiloxane fluid (a) and the amount of filler (c) being such that the viscosity of the resulting composition is below 250 Pa·s at 25° C.

6. The method of claim 5 wherein the polydiorganosiloxane fluid is endblocked with vinyldiorganosiloxy groups.

7. The method of claim 6 wherein the organohydrogensiloxane (b) is a methylhydrogensiloxane, the filler (c) is present in from 5 to 50 parts, the platinum catalyst (d) is present in from 5 to 50 parts by weight of platinum for every one million parts by weight of the polydiorganosiloxane fluid (a), and an amount of a platinum catalyst inhibitor is present sufficient to give the desired shelf life after mixing.

8. The method of claim 7 wherein the ceric hydrate is present in an amount from 0.5 to 2 parts by weight based on 100 parts by weight of the polydiorganosiloxane fluid.

9. A flame retardant silicone elastomer produced by heating the composition of claim 1 to a temperature sufficiently high to cause curing of the composition.

10. A flame retardant silicone elastomer produced by heating the composition of claim 2 to a temperature sufficiently high to cause curing of the composition.

11. A flame retardant silicone elastomer produced by heating the composition of claim 3 to a temperature sufficiently high to cause curing of the composition.

12. A flame retardant silicone elastomer produced by heating the composition of claim 4 to a temperature sufficiently high to cause curing of the composition.

* * * * *